United States Patent [19]

Olbermann

[11] 4,289,335

[45] Sep. 15, 1981

[54] MODULAR CLAMPING SYSTEM FOR PRESSURE FLUID COMPONENTS

[75] Inventor: Joseph M. Olbermann, Denver, Colo.

[73] Assignee: Wilkerson Corporation, Englewood, Colo.

[21] Appl. No.: 111,350

[22] Filed: Jan. 11, 1980

[51] Int. Cl.³ .............................................. F16L 15/00
[52] U.S. Cl. ..................................... 285/91; 285/364; 285/421; 285/309
[58] Field of Search ............... 285/364, 406, 421, 325, 285/91, 305, 308, 309, 310, 313, 178, 358, 394

[56] References Cited

U.S. PATENT DOCUMENTS

| 869,106 | 10/1907 | Schmidt | 285/421 X |
| 892,524 | 7/1908 | Jeffreys | 285/364 |
| 1,019,000 | 2/1912 | Watson | 285/305 |
| 2,744,771 | 5/1966 | Laurent | 285/91 X |
| 4,011,532 | 3/1977 | Williams et al. | 285/406 X |
| 4,070,045 | 1/1978 | Colter | 285/325 |
| 4,082,324 | 4/1978 | Obrecht | 285/364 X |

FOREIGN PATENT DOCUMENTS

| 1244960 | 9/1960 | France | 285/421 |
| 24094 | of 1895 | United Kingdom | 285/406 |

*Primary Examiner*—Dave W. Arola
*Attorney, Agent, or Firm*—Ralph F. Crandell

[57] ABSTRACT

A modular clamping system for coupling pressure fluid components. Each component is formed with a head or body which may contain appropriate conduits and passages. On each side of the body there is provided transversely extending, downwardly tapered flanges which are engaged by corresponding cam surfaces on the interior surface of depending legs on a clamping yoke. A clamping or cam pin having a longitudinal flat is inserted through corresponding apertures in the depending legs and, upon rotation, tightly clamps the yoke to the component parts and thereby clamps the parts together in sealed relationship. An external mounting bracket may be provided on the yoke for mounting the assembly on a wall or other support.

7 Claims, 12 Drawing Figures

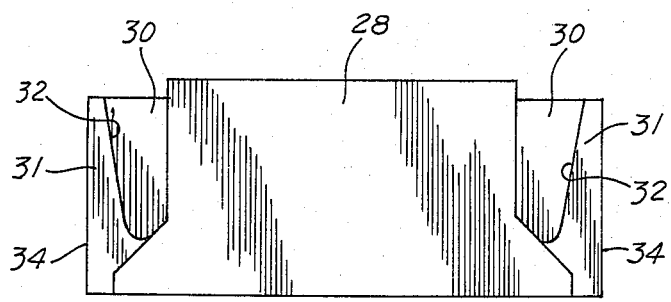
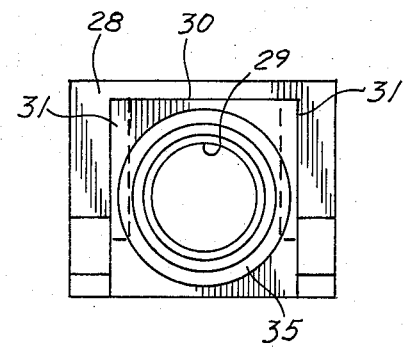
FIG. 3　　　　　　FIG. 4
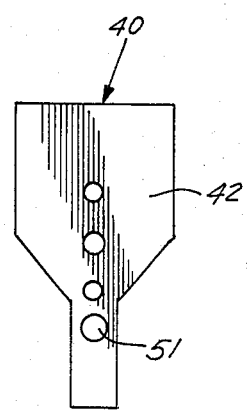
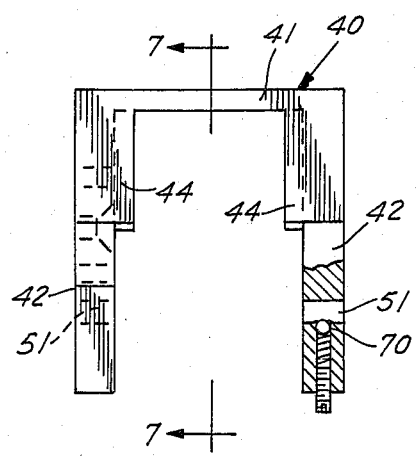
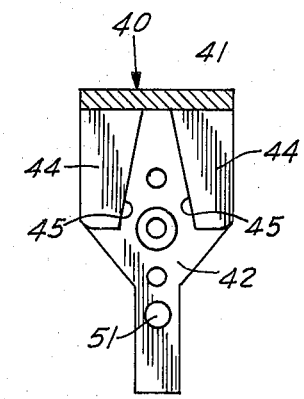
FIG. 5　　　FIG. 6　　　FIG. 7
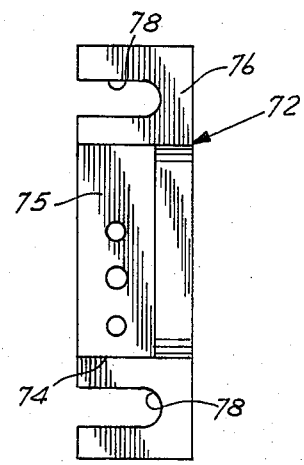
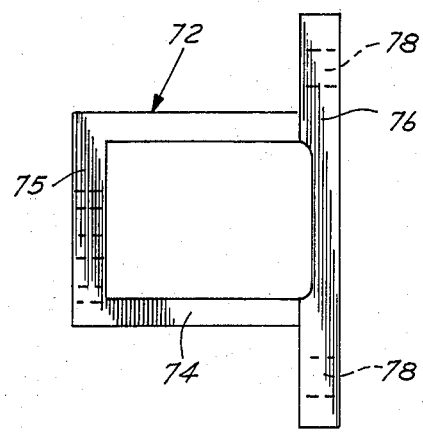
FIG. 8　　　FIG. 9
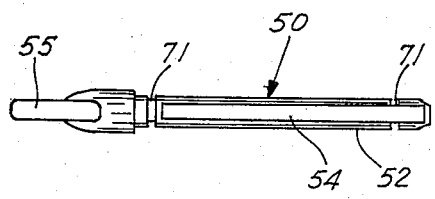
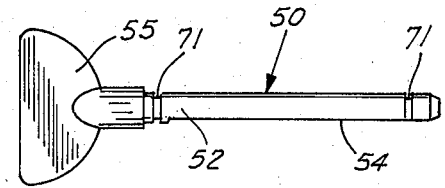
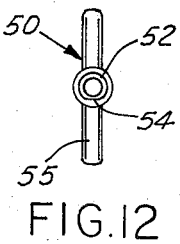
FIG. 10　　　FIG. 11　　FIG. 12

4,289,335

MODULAR CLAMPING SYSTEM FOR PRESSURE FLUID COMPONENTS

BACKGROUND OF THE INVENTION

1. Field of the Invention

The present invention relates to a modular clamping system for connecting components in a pressure fluid system, and more particularly to a clamping structure for releasably securing together two pressure fluid line components in a sealed, fluid conducting relationship. More specifically, the invention relates to a clamping system for releasably securing together compressed air line components such as filters, regulators, lubricators, driers and drains, and providing for support for the assembled components.

2. Description of the Prior Art

Fluid pressure systems, such as compressed air systems, require the use of a variety of devices such as filters, regulators, lubricators, drains, driers and the like. These components have conventionally been connected in the system by means of standard threaded piping arrangements. Various improved separable connections have been proposed, such as the separable connection described in U.S. Pat. No. 4,070,045 issued Jan. 24, 1978 to J. S. Colter et al., or the connection arrangement disclosed in U.S. Pat. No. 4,082,324 issued Apr. 4, 1978 to R. E. Obrecht.

OBJECTS OF THE INVENTION

It is the principal object of the present invention to provide an improved modular connection and clamping system for pressure fluid line components. A more specific object is to provide a connection arrangement which avoids the use of screw-threaded pipes, and which can be readily mounted or disengaged without the use of any tools.

Another object of the present invention is to provide a simplified connection system for joining components in a pressure fluid system.

Still another object of the present invention is to provide a modular connection arrangement of the foregoing type which not only serves to connect the various components, but can simultaneously support the assembly on any wall or other mounting surface.

A further object of the present invention is to provide a modular coupling system of the foregoing type which is readily engageable and disengageable, embodies a minimum number of parts or components, and which, when mounted, provides a rigid, rugged, fluid-tight assembly.

Still a further object of the present invention is to provide a modular coupling system adaptable for multi-component systems and compatible with conventional threaded couplings.

Other objects of the present invention will become apparent as the following description proceeds, taken in connection with the accompanying drawings.

SUMMARY OF THE INVENTION

In accordance with the foregoing objects, the present invention is embodied in a modular clamping system in which each component, such as a filter, regulator, lubricator, drier, drain, manifold, union or the like includes a body having a conduit therethrough and opening at either end by means of a port into a sealing surface, and having means adjacent the sealing surface for clamping engagement with a clamping yoke. Alternate ones of the sealing surfaces may include an appropriate groove and retained O-ring to provide a seal when two such surfaces are clamped in juxtaposed fluid-tight relationship.

For clamping the bodies, and thus the various components or units, together, each body is formed with transversely extending tapered flanges extending from either side of the sealing surface thereon. The tapered flanges on two adjoining units are engaged by a yoke having downwardly depending legs bearing cam surfaces on their interior surfaces corresponding cooperatively to the tapered flanges. As the yoke is engaged over the aligned component units to be clamped, the units are tightly pulled together with their abutting sealing faces in tightly sealed relationship to each other.

Means are provided for clamping the yoke in place and thus holding the units in sealed relation. One illustrative clamping means comprises a locking pin inserted through appropriate apertures defined adjacent the lower ends of the legs. The clamping pin includes a longitudinal flat to facilitate insertion of the pin through the apertured legs adjacent the component bodies. By rotating the pin, an appropriate thumb wing being provided for that purpose, the rod or shaft thereof cams against the bottom edge of the adjoining bodies, thereby further tightly pulling the yoke into place and securely clamping the same to the units.

The yoke may additionally be supported on a mounting bracket which, when secured to an appropriate surface or mounting, serves to support both the yoke and components which it secures. The modular assembly is thus held securely in place, but may be readily disengaged for replacement or repair of one or more of the components.

DESCRIPTION OF THE DRAWINGS

FIG. 3 is an elevation view of a component body embodying the present invention.

FIG. 4 is an end view of the component body shown in FIG. 3.

FIG. 5 is an end view of a yoke used in the clamping system embodying the present invention.

FIG. 6 is an elevation view of the yoke shown in FIG. 5.

FIG. 7 is a section view taken substantially in the plane of line 7—7 on FIG. 6.

FIG. 8 is an end elevation view of a mounting bracket for engagement with the yoke shown in FIG. 5 for supporting the modular clamping system as shown in FIG. 2.

FIG. 9 is an elevation view of the mounting bracket shown in FIG. 8.

FIG. 10 is a plan view of a clamping pin for use in the modular clamping system shown in FIG. 1.

FIG. 11 is an elevation view of the pin shown in FIG. 10.

FIG. 12 is an end view of the pin shown in FIG. 10.

DESCRIPTION OF THE PREFERRED EMBODIMENT

Figure 1:
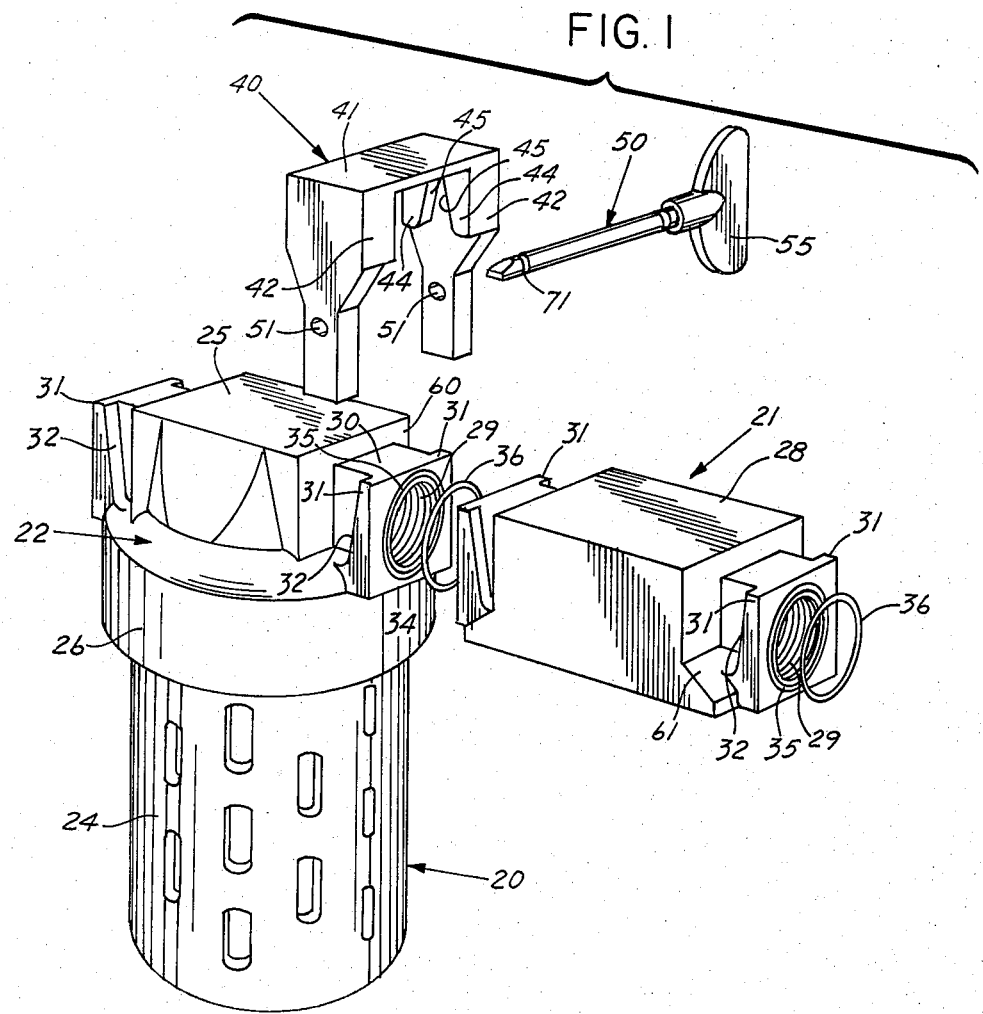
FIG. 1 is an exploded isometric view of a modular clamping system embodying the present invention.

The modular clamping system embodying the present invention for releasably coupling pressure fluid system components in fluid-tight relationship is shown in the accompanying drawings. As illustrated, the connection system is utilized to connect a pressure fluid line component 20 which may be, for example, a filter, regulator, lubricator, drain, drier or the like, to a union or manifold 21, or other similar component. Various permutations and combinations of units may be connected by utilizing the present invention and the two elements shown are for purposes of illustration only.

The pressure fluid component 20 includes a head 22 to which is mounted a container and guard 24 enclosing a filter, lubricator, drain or the like (not shown). The head includes a body 25 formed with a depending skirt 26 to which the container and guard 24 are mounted. Likewise, the union or manifold 21 is formed with a body 28. Both the component body 25 and manifold or union body 28 define a conduit or passage having appropriate ports 29 at either end thereof. The union or manifold 21 may have two or more ports, and may be formed as a "T", "Y" or the like. The ports 29 are interiorly threaded to provide for connection of the various components by means of threaded pipes as an alternative to the improved connection embodying the present invention.

The bodies are symmetrical, each end being essentially a mirror image of the other, in order that various components, manifolds and the like may be serially connected. In order to connect two fitting bodies together, each body is defined with a coupling section formed by a reduced end portion 30 through one end of which a passage 29 opens. On either lateral side of the passage 29, the reduced end section 30 is provided with a tapered flange 31. In the configuration shown in the drawings, the flanges 31 taper from a relatively narrow portion at the top to a wider portion at the bottom, thereby defining a sloping shoulder or cam surface 32 directed oppositely from the passage opening 29. On each end of the body, the cam surfaces on each flange 31 are parallel and coplanar. The face 34 of the flanged end portion through which the passage 29 opens defines a sealing surface and may be provided with an appropriate groove 35 surrounding the passage for containing an O-ring seal 36. Generally, one end surface 34 of a component or manifold body is provided with an O-ring seal while the opposite surface does not contain such a seal. In this way, when two surfaces 34 on adjacent components are placed together, a single O-ring seal 36 is provided between them.

For holding two components together when their corresponding end surfaces 34 are juxtaposed with the passages 29 in alignment, means are provided for engaging the tapered cam surfaces or shoulders 32 to pull and seal the components together. For this purpose, there is provided a yoke 40 formed by a top or web portion 41 with depending legs 42 spaced apart sufficiently to straddle the juxtaposed end portions 30 of the abutting connector bodies 25, 28. For engaging the tapered shoulders 32 and drawing the bodies tightly together, each leg 42 is provided on its internal surface with a pair of spaced shoulders 44 defining correspondingly tapered cam surfaces 45. As the yoke 40 is dropped over the juxtaposed connector bodies, the yoke shoulders 45 cammingly engage the body shoulders 32 thereby to draw the bodies tightly together with their abutting surfaces 34 and seal 36 in snug sealing engagement. As the yoke is forced tightly down over the connectors, the respective cam surfaces 32, 45 are firmly engaged with each other.

In order to hold the yoke in place and thereby securely engage the components, there is provided a locking pin 50 which is inserted through aligned apertures 51 in the depending legs 42 of the yoke. The locking pin 50, when inserted, frictionally abuts the lower leading edges of each body end portion 30, thereby to hold the yoke securely in place. In order to provide a clamping engagement between the locking pin 50, the yoke 40 and the abutting bodies 25, 28, the locking pin is provided with a shank 52 having a flat 54 formed longitudinally therealong. At one end of the locking pin 50 there is provided a thumb wing 55. By inserting the locking pin through the depending legs 42 of the yoke 40 with the flat 54 directed upwardly, the locking pin can be readily slid into place. After the pin is in place, the thumb wing 55 is turned to rotate the shank 52 about its longitudinal axis and thereby cause the curved portion of the shank 52 to frictionally engage the lower surfaces of the adjacent component bodies 25, 28. In this manner, the locking action can be rapidly and effectively accomplished without the use of tools. The locking pin further pulls the yoke tightly down over the flanged ends of the connector blocks to further enhance the seal.

Figure 2:
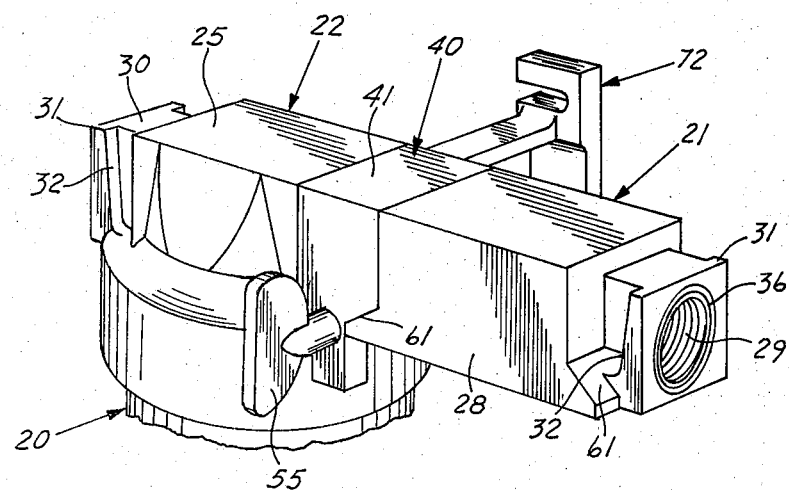
FIG. 2 is an assembled isometric view of a modular clamping system embodying the present invention.

In order to provide a smoothly contoured finished effect, the bodies 25 and 28 and their respective end portions 30 and the legs 42 of the yoke 40 are shaped to nest together as shown in FIG. 2. To this end, the end portions 30 of the bodies 25 and 28 are of a reduced size to define a vertical surface or shoulder 60 surrounding the end portion and tapering to define a sloping surface 61 near the bottom portion thereof. Similarly, the legs 42 of the yoke taper from a wider portion 62 to a relatively narrower portion 64 with an intermediate sloping section 65. Where the component includes a head 22 and skirt 26, the upper portion of the skirt defines the lower sloping surface.

To secure the locking pin in place, a spring biased ball detent 70 is provided in one leg of the yoke, engageable in an appropriate radial groove 71 in the inserted end of the locking pin 50.

The yoke 40 may be further utilized to mount the assembled pressure fluid line components onto a wall or other surface (not shown). For this purpose, a mounting bracket 72 is provided which may be secured to or formed integrally with one leg of the yoke as shown in FIG. 2. The mounting bracket includes a body portion 74 having an end wall 75 secured to the yoke leg 42. Opposite the end wall 75 the bracket is provided with a mounting flange 76 which includes appropriate screw or bolt apertures 78. When a yoke 40 and associated mounting bracket 72 is mounted on a wall or other surface, a series of pressure fluid line components can be readily mounted or dismounted from the yoke 40. The yoke thus serves both to assemble the components as well as support the same.

As indicated above, while the invention has been described in connection with a single component 20 and mainfold or connector union 21, a wide variety of combinations is possible. In addition, certain ones of the components may be mounted in place or utilize threaded pipe connections in addition or supplemental to the modular connector and clamping system embodying the present invention.

While one illustrative form of the present invention has been shown in the drawings and described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

What I claim is:

1. A clamping structure for releasably securing together two pressure fluid conducting components in sealed relationship, comprising, in combination, means on each component defining a sealing surface including a pressure fluid port therein and adapted for juxtaposed sealing engagement with a corresponding sealing surface on the other component, transversely extending flanges adjacent each of said sealing surfaces and defining on each component coplanar cam surfaces sloping away from the adjacent sealing surface, a U-shaped yoke having spaced parallel depending legs for straddling three sides of said components, means on each of said legs defining a pair of opposed sloping cam surfaces engageable with said flanges when said component sealing surfaces are positioned together for clamping said bodies together in sealed pressure fluid conducting engagement, and means for releasably securing said yoke to said components.

2. A clamping structure for releasably securing together two pressure fluid conducting components in sealed relationship, comprising, in combination, means on each component defining a sealing surface having a pressure fluid port therein and adapted for juxtaposed sealing engagement with a corresponding sealing surface on the other component, transversely extending flanges adjacent each of said sealing surfaces and defining on each component coplanar cam surfaces sloping away from the adjacent sealing surface, a U-shaped yoke having spaced parallel depending legs for straddling three sides of said components, means on each of said legs defining a pair of opposed sloping cam surfaces engageable with said flanges when said component sealing surfaces are positioned in face to face engagement for clamping said bodies together in sealed pressure fluid conducting engagement, and a clamping pin extending through said legs below said cam surfaces and having a portion intermediate its ends for clamping engagement with said juxtaposed components upon rotation of said pin thereby to hold said components and yoke tightly together.

3. A clamping structure for releasably securing together two pressure fluid conducting components in sealed relationship, comprising, in combination, a connector body on each component having a sealing surface including a pressure fluid port therein and adapted for juxtaposed sealing engagement with a corresponding sealing surface on the other body, each body having external transversely extending flanges adjacent said sealing surfaces, means on said flanges defining cam surfaces sloping away from the adjacent sealing surface, a U-shaped yoke having spaced depending legs for straddling said components, means on each of said legs defining a pair of opposed sloping cam surfaces engageable with corresponding cam surfaces on said flanges when said two connector bodies are positioned in face to face engagement and said yoke is positioned over said components in engagement with said flanges for clamping said bodies together in sealed pressure fluid conducting engagement, and a clamping pin extending through apertures in said legs below said cam surfaces and having a portion intermediate its ends for clamping engagement with said juxtaposed components upon rotation of said pin thereby to hold said components and yoke tightly together.

4. A connector structure for releasably joining two pressure fluid conducting components in sealed fluid-tight relationship comprising, in combination, a body on each component including a pressure fluid passage defined therein, each said body having a sealing face surrounding a port of said passage and adapted for juxtaposition in sealed pressure fluid conducting relationship with a corresponding sealing face and passage port of the other component body, transversely extending opposed flanges on each said body on opposite sides of said passage adjacent to said sealing face, said flanges each having a tapered surface on the side thereof opposite the sealing surface with said tapered surfaces being coplanar and defining cam surfaces, an inverted U-shaped yoke having spaced parallel legs for straddling a pair of juxtaposed component bodies having abutting sealing faces and aligned passages, sloping cam shoulders on the facing surfaces of said legs defining a V-shaped notch on each leg forming cam surfaces engageable with the corresponding sloping surfaces on said flanges for clamping said component bodies together in sealed pressure fluid conducting relationship, and a clamping pin insertable through apertures in said legs below said cam shoulders when said yoke is straddled over said bodies, said clamping pin having a longitudinal cam surface engageable with said bodies adjacent the ends thereof upon rotation of said pin for pulling said yoke tightly over said flanges and thereby forcing said sealing surfaces tightly together in sealed relationship and for clamping said yoke securely in place to prevent separation of said yoke and said component bodies.

5. A connector structure for releasable joining pressure fluid conducting components in sealed fluid-tight relationship comprising, in combination, a body on each component including a pressure fluid passage defined therein, each said body having a sealing face surrounding a port of said passage and adapted for juxtaposition in sealed pressure fluid conducting relationship with a corresponding sealing face and passage port of the other component body, transversely extending opposed flanges on each said body on opposite sides of said passage adjacent to said sealing face, said flanges each having a tapered surface on the side thereof opposite the sealing surface with said tapered surfaces being coplanar and defining cam surfaces, a flexible, compressible O-ring seal on one of said sealing faces surrounding said port, an inverted U-shaped yoke having spaced parallel legs for straddling a pair of juxtaposed component bodies having abutting sealing faces and aligned passages, sloping cam shoulders on the facing surfaces of said legs defining a V-shaped notch on each leg forming cam surfaces engageable with the corresponding sloping surfaces on said flanges for clamping said component bodies together in sealed pressure fluid conducting relationship, and a clamping pin insertable through apertures in said legs below said cam shoulders when said yoke is straddled over said bodies, said clamping pin having a longitudinal cam surface engageable with said bodies adjacent the ends thereof upon rotation of said pin for pulling said yoke tightly over said flanges and thereby forcing said sealing surfaces and O-ring seal tightly together in sealed relationship and for clamping said yoke securely in place to prevent separation of said yoke and said component bodies.

6. A connector structure for releasably joining pressure fluid conducting components in sealed fluid-tight relationship comprising, in combination, a body on each component including a pressure fluid passage defined therein, opening to the exterior of said body through ports, said body having a sealing face surrounding each port of said passage and adapted for juxtaposition in sealed pressure fluid conducting relationship with a corresponding sealing face and passage port of another component body, an inverted U-shaped yoke having spaced parallel legs for straddling three sides of a pair of component bodies having abutting sealing faces and aligned passages, means on each of the legs of said U-shaped yoke cooperatively engaging complimentary means on said bodies for releasably retaining said component bodies together in sealed fluid pressure conducting relationship, and means engageable with said yoke and said bodies for pulling said yoke tightly over said bodies and thereby forcing said sealing surfaces tightly together in sealed relationship and for clamping said yoke securely in place to prevent separation of said yoke and said component bodies.

7. A connector structure for releasably joining pressure fluid conducting components in sealed fluid-tight relationship comprising, in combination, a body on each component including a pressure fluid passage defined therein opening to the exterior of said body through ports, said body having a sealing face surrounding each port of said passage and adapted for juxtaposition in sealed pressure fluid conducting relationship with a corresponding sealing face and passage port of another component body, a compressible seal ring between said sealing faces surrounding said passage port, an inverted U-shaped yoke having spaced parallel legs for straddling three sides of a pair of component bodies having abutting sealing faces, aligned passages, and intermediate seal ring, means on each of the legs of said U-shaped yoke cooperatively engaging complimentary means on said bodies for clamping said component bodies together in sealed fluid pressure conducting relationship, and means engageable with said yoke and said bodies for pulling said yoke tightly over said bodies and thereby forcing said sealing surfaces tightly together in sealed relationship and compressing said compressible seal ring and for clamping said yoke securely in place to prevent separation of said yoke and said component bodies.

* * * * *